Oct. 26, 1965 N. J. DALTON 3,213,554
IMPLEMENT ROTARY DRAW BAR AND HITCH CONNECTIONS
Filed Sept. 12, 1963 3 Sheets-Sheet 2

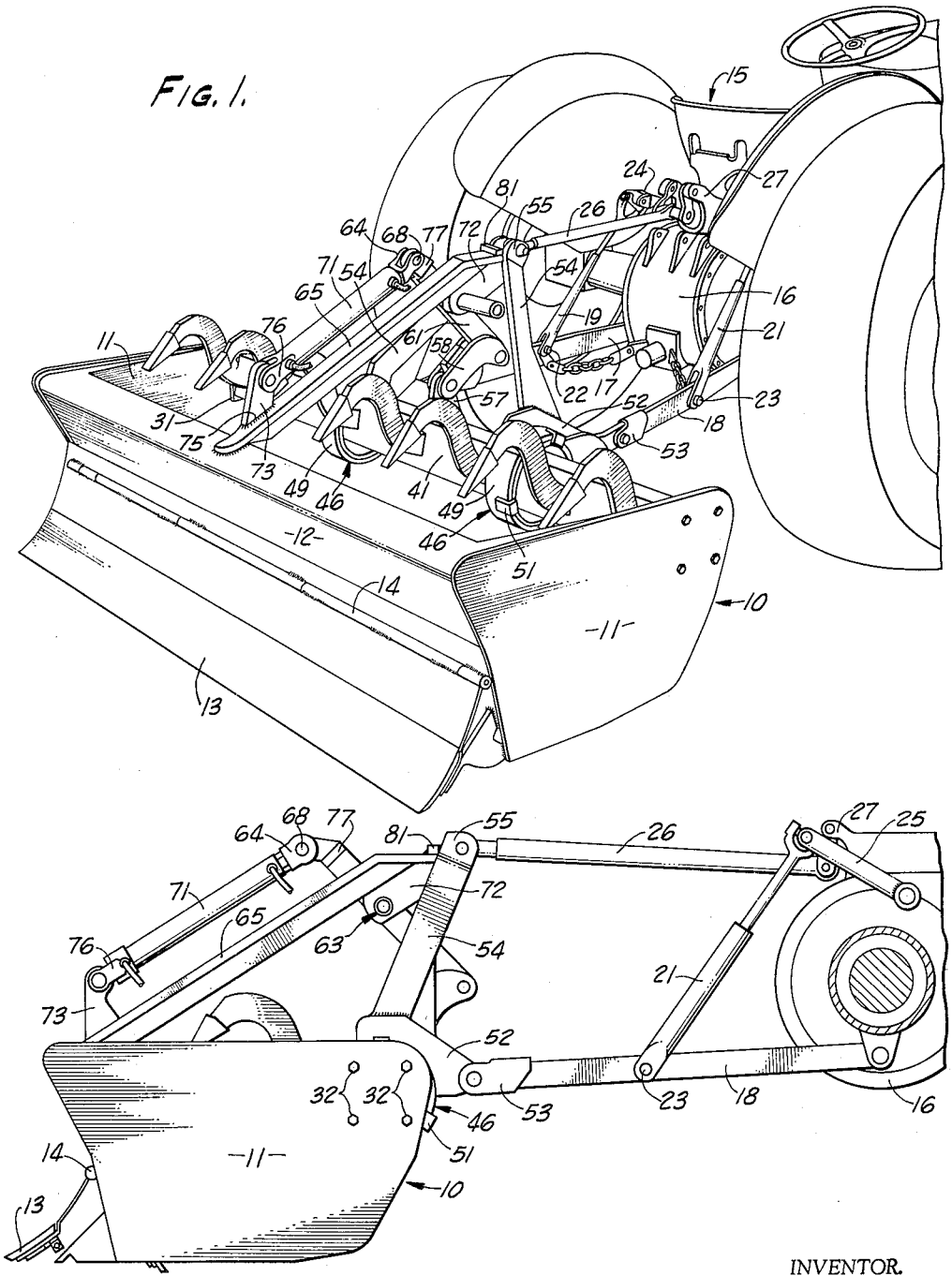

INVENTOR.
NEVILLE J. DALTON
BY
George Douglas Jones
ATTORNEY

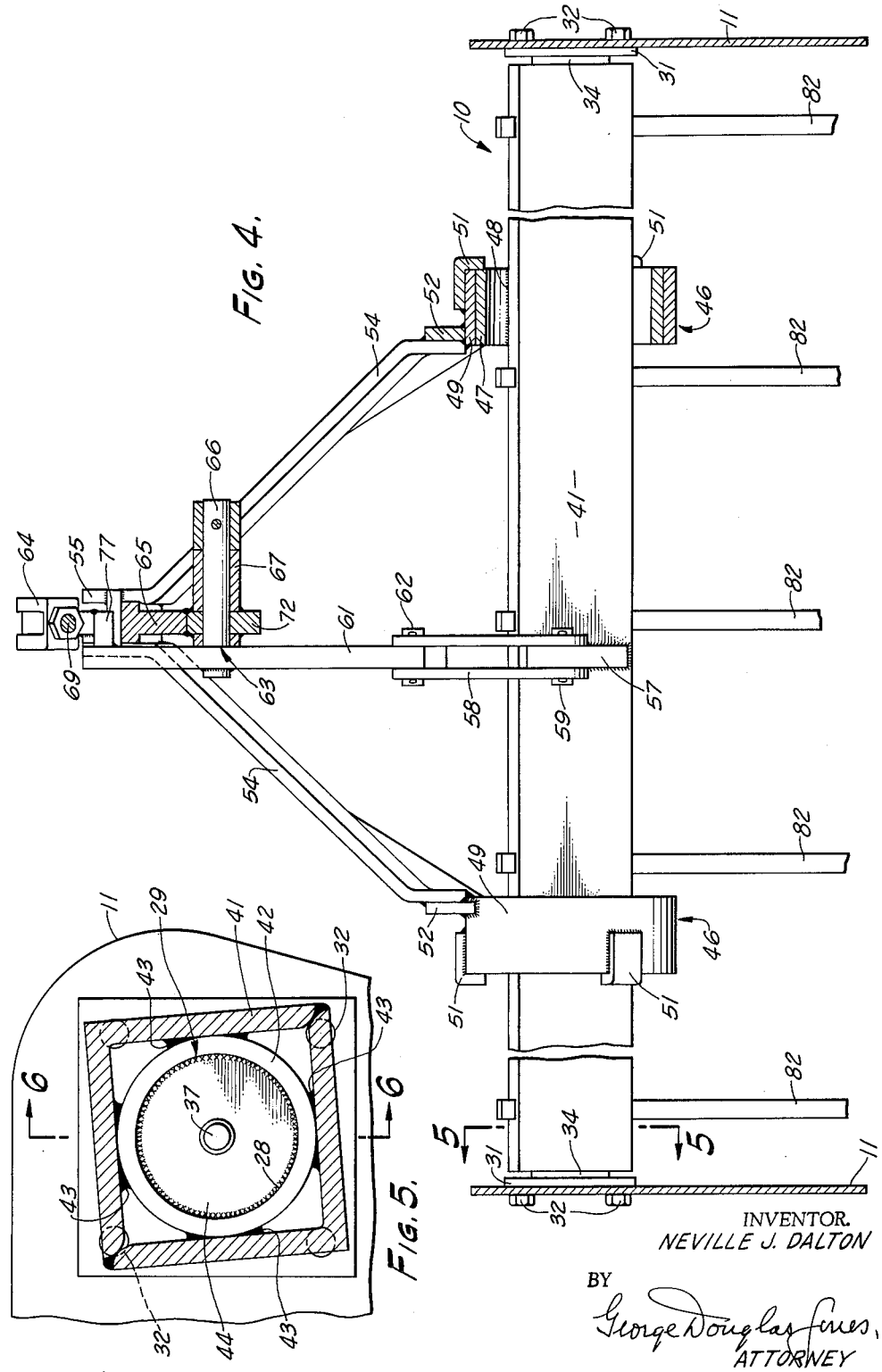

3,213,554
IMPLEMENT ROTARY DRAW BAR AND
HITCH CONNECTIONS
Neville J. Dalton, Torrance, Calif., assignor to Orendorff
Manufacturing Company, Los Angeles, Calif., a corporation of California
Filed Sept. 12, 1963, Ser. No. 308,495
1 Claim. (Cl. 37—145)

This invention is directed to an earth working implement, the particular type of the said implement that is herein illustrated and described in detail is one of the several earth working implements, to which the instant invention may form a part of the same, and especially to the connection and application of the hitch connection and operation of the earth working tools of the implement.

The principal object of the instant invention resides in the novel and efficient design, wherein the tool carrying member forms part of the implement structure, as well as providing draw bar means, said means being in rotatable relation with the implement, and further, said draw bar means is provided with spaced apart bearing members to which the hitch or hitches of the tractor is connected.

A further object of the invention, provides fluid actuated means in combination with linkage, leverage and locking means, wherein said lever is locked when setting the earth working tools in working position, and unlocked when the tools are moved to nonoperating position through means of the fluid actuated member, which carries the tools in raised position or nonoperating position.

A still further object of the present invention provides the well known and long used "A" type, or three point hitch structure to which the tractor hitch members are secured by pivotal and rotary means.

Other objects of my invention and the invention itself, will become apparent by reference to the following description of certain embodiments of my invention, and in which description reference will be directed to the accompanying drawings illustrating said embodiments, in which like numerals represent like parts.

FIG. 1 is an isometric view of the invention, in combination, with an earth working implement attached to a dirigible, mobile, power unit.

FIG. 2 is a side elevation of an earth working implement showing the hitch connections and a fluid actuated member in relation to the linkage, leverage, locking means.

FIG. 4 is a rear sectional view, taken on line 4—4 of FIG. 3.

FIG. 5 is a section of the bearing of the draw bar carrying earth working tools, mounted on the side members of the implement taken on line 5—5 of FIG. 4.

Figure 3:
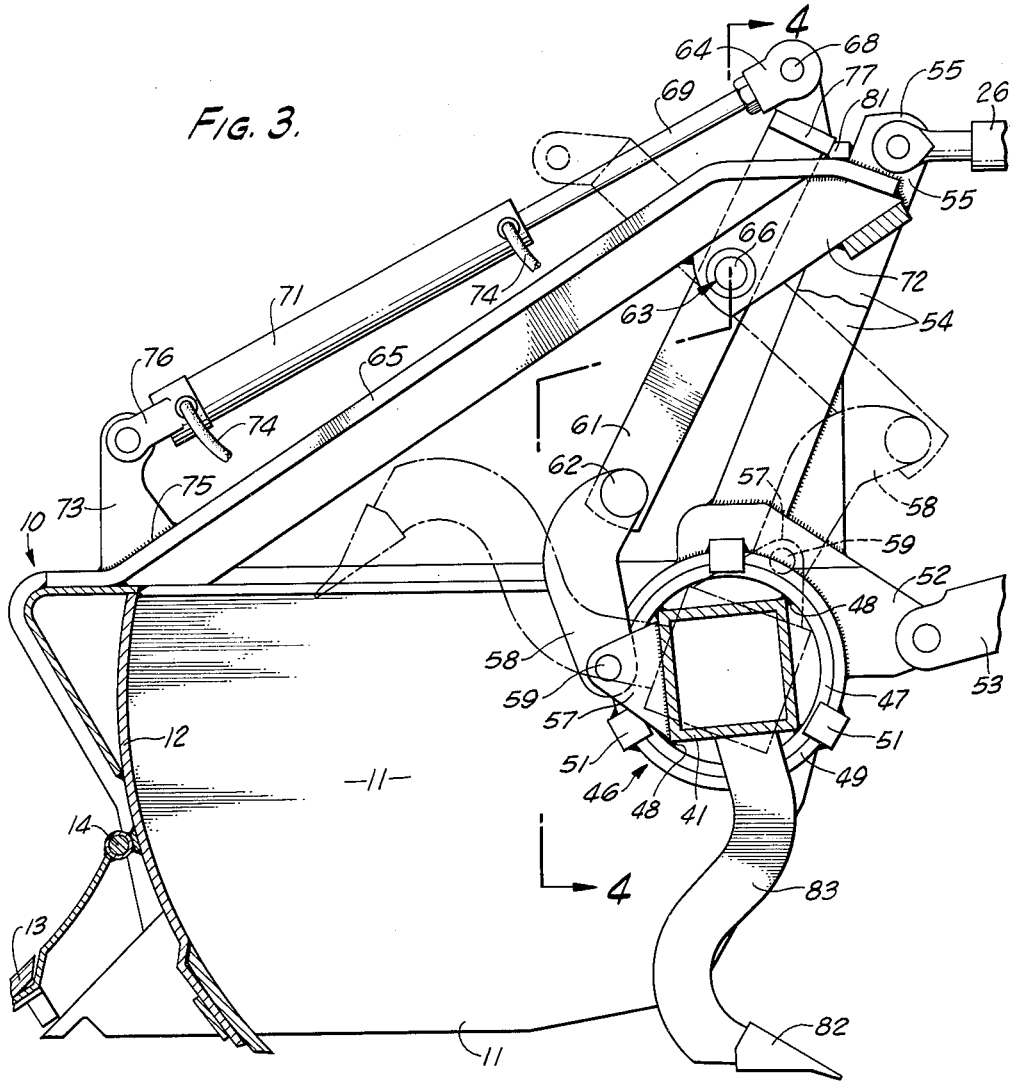
FIG. 3 is a side elevational section showing the detail of the raising and locking means, and other structure forming a part of this invention.

For the purpose of conveying an understanding of my invention, I illustrate in the drawings, an earth working implement of the combination, scraper, scarifier type, comprising, the implement 10, having side members 11—11, a rear member 12, attached to a scraper 13, by hinge means 14. It should be noted that the front end of the implement 10, is open.

The implement 10, is attached to a conventional type wheel tractor 15, having a rear axle and driving housing 16, in which is contained the conventional "A" type or three point hitch operating mechanism (not shown), which functions to raise and lower the hitch members 17, and 18, by means of the lifting members 19, and 21, which are pivotally secured thereto at 22, and 23, and pivotally attached to the hydraulic actuated members 24, and 25. The upper hitch member 26, is pivotally attached to the stub arm 27, of the tractor housing 16.

The implement shown, is specifically a scraper, scarifier type of earth working implements; and, possibly, the invention is most useful when forming a part of an implement of the scraper, scarifier type, because, implements of this type are used in work requiring scraping and scarifying, and it is essential that said implement doing this type of work, must be positive in action, as well as rapid in removing the scarifier teeth from the soil and into the soil, and when in operation to be rigidly secured in working position.

But it is not the intention of this invention, that the appended claims shall be limited to an implement of the scraper, scarifier type, nor even to industrial implements, unles such limitation is plainly expressed.

Referirng now to the mechanism of the invention in detail.

Figure 6:
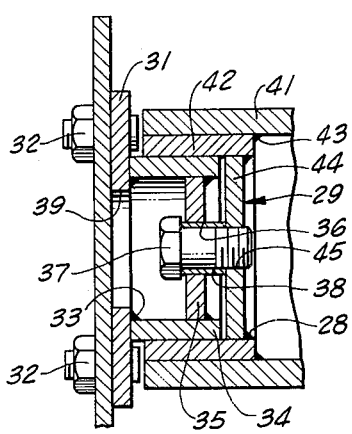
FIG. 6 is a section of the bearing members carrying the draw bar and taken on line 6—6 of FIG. 5.

The side members 11—11, have secured thereto, preferably at the upper front portion thereof, bearing members 29, best illustrated by the sectional drawing of FIG. 6, wherein side members 11—11, have secured thereto a plate 31, and rigidly secured thereto by means of bolts 32, or by conventional welding means. Rigidly secured to said plate 31, preferably by welding means 33, is a tubular member 34, having a circular disc 35, secured internally thereto by weld means. An aperature 36, is centrally positioned to receive bolt 37, and a bearing member 38, provides the bearing means for said bolt 37. An opening 39, is provided centrally of the plate 31, to permit access to the bolt 37.

A tool carrying member 41, hereinafter at times referred to as a draw bar, preferably of square tubing is provided with a bearing member 42, rigidly secured thereto by welding means 43, best illustrated in FIG. 6, of the drawings. A circular disc 44, is preferably welded to the bearing 42, at weld 28, and having a threaded central portion 45, in intimate relation with the bearing member 38.

It should be here noted that a duplicate bearing member is attached and secured to the opposite side member 11, thus providing bearing means to permit rotation of the carrying member 41, in relation to the side members 11—11, this function and its need will become apparent as the description continues.

Referring again to implement 10, and the tool carrying member or draw bar 41; intermediate the ends thereof are positioned in spaced apart relation, bearing members 46, said bearings comprising a tubular portion 47, secured in rigid relation to said member 41, preferably by weld means 48, best shown in FIG. 3, of the drawings. Positioned over said tubular member 47, and in intimate relation therewith is an outer tubular member 49, forming a complete bearing member 46.

Secured to said tubular member 49, are spaced apart retainers 51, to prevent lateral movement of said tubular member 49, with respect to tubular member 47, and maintaining the same in rotatable relation with said tubular member 47.

Secured to the outer tubular member 49, is a hitch connecting stub arm 52, for connection to hitch arms 17, and 18, this connection is preferably a vertical swivelable member 53, to permit movement in that plane. Also secured to said tubular member 49, and in rigid relation are the legs 54, of the "A" type or three point hitch, said legs terminating at the apex of the "A" 55, in open spaced apart relation, thus providing means for pivotally attaching the upper hitch member 26, thereto.

The linkage, leverage, locking means includes, a stub arm 57, secured to tool carrying member 41, and positioned, preferably intermediate the said bearing members 49. A link 58, is pivotally secured to the said member 57, by pivot means 59, the lower terminal of lever arm 61, is secured to the link arm 58, by pivot means 62.

The fulcrum of lever arm 61, is provided at pivot point 63, with pivot rod 66, which is carried in the housing 67, forming a part of the depending member 72, which is secured by weld means to the brace 65. The upper terminal of the lever arm 61, is provided with an aperture for the reception of pivot pin 68, to which is attached the yoke member 64, forming the terminal of the working piston 69, of the fluid actuated member 71. The said member 71, is pivoted by means of yoke 76 to the upstanding member 73, which in turn is secured by weld means 75 to the rear brace member 65.

Positioned on the upper portion of the lever arm 61, is the lock abutting member 77, which locks against stop lock 81, positioned on the upper portion of the "A" leg 54, as best illustrated in FIG. 3, of the drawings.

In operating the implement 10, and its appurtenances, it is important to not that the novelty of the instant invention resides in the draw bar 41, which not alone functions as the conventional draw bar as it is applied to earth working implements as used today, but, rather provides the means for the several functions, to wit, hitching means to bearings 46, carried by the draw bar, removably attached and detached working tools 82, and 83, and the like, said draw bar carried by bearing members 42, secured to the said implement, by its side members 11—11, for rotation of said draw bar to place the earth working tools 82, and 83, in and out of working position, and clearly defined linkage, leverage, and locking means functioning through the medium of fluid actuated means 71, wherein said leverage means locks the tools 82, and 83, when in working position against rotation, and said tools 82, and 83 are released from working position solely by movement of the working piston 69, of the fluid actuated means 71, by unlocking the lever arm abutting member 77, from contact with the stop lock 81.

It should be further noted that the hitch connection for hitch members 17, and 18, are secured to the draw bar bearings 46, thus permitting movement, not alone of the working tools 82, and 83, but also permitting the implement 10 to be raised and lowered independently of the working tools.

Having fully described my invention, it is to be understood that I do not wish to be limited to the details herein set forth, but rather that the instant invention is covered by the full scope of the appended claim.

What I claim is:

In an earth working implement having side walls and an end wall forming a scarifier scraper implement, said implement being operated in connection with a mobile power unit having conventional "A type" hitch connections, which includes an upper hitch member and a pair of fluid actuated draft members extending rearwardly from the mobile power unit, a unitary combination draw bar and earth working tools supporting member, said tools being removably secured thereto, said unitary combination draw bar and earth working tools supporting member being carried by a pair of rotary bearing members secured to the upper front portion of the side walls of said earth working implement, a pair of rotary bearings forming a part of said unitary combination draw bar and earth working tools supporting member and positioned intermediate the ends of said unitary combination draw bar and earth working tools supporting member and in spaced apart relation, the legs of the "A" of said "A type" hitch being rigidly secured to said last named rotary bearings and the upper hitch portion or apex of said "A" member providing means for pivotal connection to the upper hitch draft member of the "A type" hitch and means forming a part of said last mentioned rotary bearings for pivotally attaching the pair of lower fluid actuated draft members thereto, and means for raising and lowering the earth working tools by rotating said unitary combination draw bar and earth working tools supporting member, the entire unitary combination draw bar and earth working tools supporting member and spaced apart bearing members, functioning on a common axis supported and carried by said first mentioned rotary bearings.

References Cited by the Examiner

UNITED STATES PATENTS 2,839,851  6/58  Geiszler _____ 172—197 X
3,069,791  12/62  French _____ 37—145

ABRAHAM G. STONE, *Primary Examiner.*

T. GRAHAM CRAVER, ANTONIO F. GUIDA,
*Examiners.*